(12) United States Patent
Choi

(10) Patent No.: US 10,543,721 B2
(45) Date of Patent: Jan. 28, 2020

(54) TIRE PRESSURE MONITORING SYSTEM AND METHOD OF OPERATING THE TIRE PRESSURE MONITORING SYSTEM

(71) Applicant: HYUNDAI MOTOR COMPANY, Seoul (KR)

(72) Inventor: Sung Ho Choi, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 371 days.

(21) Appl. No.: 15/385,322

(22) Filed: Dec. 20, 2016

(65) Prior Publication Data

US 2018/0117975 A1 May 3, 2018

(30) Foreign Application Priority Data

Nov. 2, 2016 (KR) ........................ 10-2016-0145204

(51) Int. Cl.
*B60C 23/04* (2006.01)
*G01C 21/34* (2006.01)
*G01C 21/36* (2006.01)

(52) U.S. Cl.
CPC ...... *B60C 23/0479* (2013.01); *B60C 23/0435* (2013.01); *G01C 21/3407* (2013.01); *G01C 21/3691* (2013.01)

(58) Field of Classification Search
CPC .. G01M 17/02; G01M 17/021; G01M 17/022; G01M 17/027; G01M 17/025; G01M 17/024; G01M 17/10; G01M 7/08; G01M 17/0076; G01M 17/013; G01M 17/03; G01M 17/04; G01M 17/06; G01M 17/08; G01M 1/02; G01M 1/045; G01M 1/12; G01M 1/225; G01M 3/40; G01M 5/0091; G01M 7/02; G01M 99/00; G01M 99/002; H01L 2924/00; H01L 2224/48247; H01L 2224/73265; H01L 2224/97; H01L 2924/00012; H01L 2224/32145; H01L 2224/32245; H01L 2924/00014; H01L 2224/2919; H01L 2924/0002; H01L 2924/12044; H01L 2924/13091; H01L 2924/14; H01L 2924/1461; H01L 2924/15788; H01L 2924/181; H01L 2224/05599; H01L 2224/45099;
(Continued)

(56) References Cited

U.S. PATENT DOCUMENTS

2016/0121668 A1* 5/2016 Singh ........................ G01L 5/00
                                                                        702/42
2017/0050476 A1* 2/2017 Liu ...................... B60C 23/0477

FOREIGN PATENT DOCUMENTS

JP    2008-087704 A     4/2008
KR    10-2005-0042477 A  5/2005
KR    10-2014-0115635 A  10/2014

OTHER PUBLICATIONS

Office Action issued in Korean Patent Application No. 10-2016-0145204, dated May 29, 2018.

* cited by examiner

*Primary Examiner* — Andre J Allen
(74) *Attorney, Agent, or Firm* — Morgan, Lewis & Bockius LLP

(57) ABSTRACT

A method of operating a Tire Pressure Monitoring System (TPMS) includes executing tire pressure monitoring of at least one tire installed on a vehicle in a first mode, and transmitting frequency signal loss information to a center if a loss of a frequency signal in the first mode occurs in a designated time period.

14 Claims, 4 Drawing Sheets

(58) Field of Classification Search
CPC ............. H01L 2224/83; H01L 2224/85; H01L 2924/0665; H01L 21/02118; H01L 21/02175; H01L 21/02183; H01L 21/02186; H01L 21/02189; H01L 21/54; H01L 21/561; H01L 2224/05554; H01L 2224/48149; H01L 2224/49174; H01L 2224/4941; H01L 23/04; H01L 23/3107; H01L 23/49551; H01L 23/49575; H01L 24/09; H01L 24/48; H01L 24/49; H01L 24/73; H01L 24/93; H01L 24/97; H01L 25/03; H01L 25/50; H01L 27/20; H01L 2924/16151; H01L 35/34; H01L 41/25; H01L 41/311; H01L 41/313; B60C 23/0494; B60C 23/0493; B60C 23/04; B60C 2019/004; B60C 19/00; B60C 23/0498; B60C 23/0411; B60C 23/0496; B60C 23/064; B60C 23/0408; B60C 23/041; B60C 23/0488; B60C 23/20; B60C 11/243; B60C 23/06; B60C 11/246; B60C 23/00; B60C 23/0486; B60C 23/061; B60C 11/0083; B60C 13/003; B60C 2009/2038; B60C 23/003; B60C 23/004; B60C 23/02; B60C 23/0401; B60C 23/0416; B60C 23/0433; B60C 23/0447; B60C 23/0455; B60C 23/0489; B60C 23/0491; B60C 23/066; B60C 25/002; B60C 25/005; B60C 25/007; B60C 29/02; B60C 3/04; B60C 99/00; B60C 99/006; B60C 11/24; B60C 13/001; B60C 13/02; B60C 15/0036; B60C 17/02; B60C 2009/0071; B60C 2009/2022; B60C 2200/02; B60C 2200/06; B60C 2200/065; B60C 23/001; B60C 23/007; B60C 23/008; B60C 23/0406; B60C 23/0413; B60C 23/0427; B60C 23/0454; B60C 23/0459; B60C 23/0462; B60C 23/0467; B60C 23/0471; B60C 23/0472; B60C 23/0474; B60C 23/0476; B60C 23/065; B60C 23/10; B60C 25/0548; B60C 25/056; B60C 25/132; B60C 25/138; B60C 25/18; B60C 29/005; B60C 9/005; B60C 9/18; B60C 9/1807; B60C 9/20; B60C 9/28
USPC ................................................ 73/146–146.8
See application file for complete search history.

20

US 10,543,721 B2

TIRE PRESSURE MONITORING SYSTEM AND METHOD OF OPERATING THE TIRE PRESSURE MONITORING SYSTEM

This application claims the benefit of priority to Korean Patent Application No. 10-2016-0145204, filed on Nov. 2, 2016 with the Korean Intellectual Property Office, which is hereby incorporated by reference as if fully set forth herein.

TECHNICAL FIELD

The present disclosure relates to a tire pressure monitoring system and a method of operating the same.

BACKGROUND

In general, a Tire Pressure Monitoring System (TPMS), which is installed in a vehicle and measures pneumatic tire pressures, may sense the pneumatic tire pressures of tires mounted on the vehicle. If a specific sensed pneumatic tire pressure is lowered to a reference value or lower, the TPMS may inform a driver of the low pneumatic tire pressure.

Vehicles should be provided with such a TPMS installed therein according to Federal Motor-Vehicle Safety Standard (FMVSS) 138 of the National Highway Traffic Safety Administration (NHTSA). The application rate of TPMS systems is gradually increasing, and it is expected that most countries will require installation of TPMS systems in the future. Such a trend is growing because, if a vehicle drives at high speed under the condition that a pneumatic tire pressure is lowered by 25% or more, an accident rate due to insufficient tire pressure may be increased.

Therefore, research on technology for accurately measuring tire pressures is being performed, and there is an unmet need for a new and improved TPMS system.

SUMMARY

Accordingly, the present disclosure is directed to a tire pressure monitoring system and a method of operating the same method that substantially obviate one or more problems due to limitations and disadvantages of the related art.

An object of the present disclosure is to provide a tire pressure monitoring system which monitors tire pressures using big data.

Another object of the present disclosure is to provide a tire pressure monitoring system which measures tire pressures through a combined direct and indirect method.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with exemplary embodiments of the disclosure, as embodied and broadly described herein, a method of operating a Tire Pressure Monitoring System (TPMS) includes executing tire pressure monitoring of at least one tire installed on a vehicle in a first mode, and transmitting frequency signal loss information to a center, if loss of a frequency signal in the first mode occurs in a designated time section.

In some aspects, the present disclosure provides a Tire Pressure Monitoring System (TPMS) including a first measurement device for executing tire pressure monitoring of at least one tire installed on a vehicle in a first mode, and a controller for transmitting frequency signal loss information to a center if a loss of a frequency signal in the first mode occurs in a designated time period.

In some aspects, the present disclosure provides a big data center, including a big data base (DB) configured to collect and analyze a frequency shadow section information or road information, used in a Tire Pressure Monitoring System (TPMS) according to various geographic areas, in real time, wherein the frequency shadow section information or the road information received from the big DB is provided to at least one vehicle.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
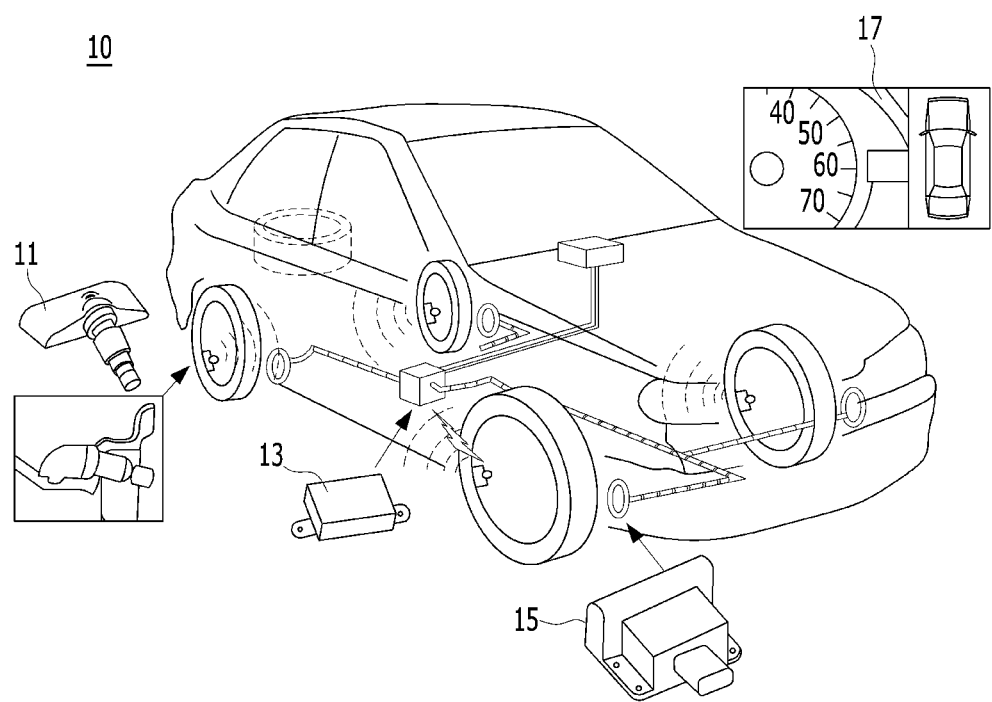
FIGS. 1 and 2 are views illustrating general methods of measuring tire pressures for comparison.

Reference will now be made in detail to the exemplary embodiments of the present disclosure, examples of which are illustrated in the accompanying drawings. In the drawings, the same or similar elements are denoted by the same reference numerals even though they are depicted in different drawings.

Hereinafter, an apparatus, a system and a method applied to exemplary embodiments of the present disclosure will be described in detail with reference to the accompanying drawings.

Although a Tire Pressure Monitoring System (TPMS) may be referred to as an automatic pneumatic tire pressure sensing system, a tire pressure sensing system, a tire pressure monitoring system, etc., the TPMS will herein be referred to as a tire pressure monitoring system.

Figure 2:
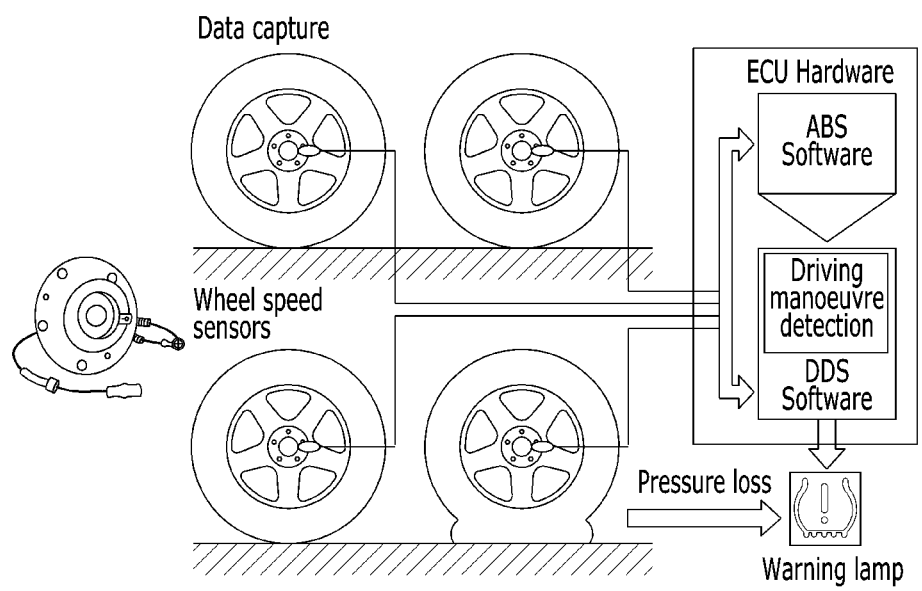

FIGS. 1 and 2 are views illustrating general methods of measuring tire pressures for comparison.

FIG. 1 is a view illustrating a direct-type TPMS 10.

The direct-type TPMS 10 is a TPMS which directly measures tire pressures.

A tire pressure sensor 11 is mounted at a tire valve and measures a tire pressure.

A receiver 13 may receive tire pressure information from the tire pressure sensor 11 and, if a specific received tire pressure is below a reference value, provide information on which tire pressure is below the reference value to a display 17. The display 17 may provide a pressure warning to passengers.

FIG. 2 is a view illustrating an indirect-type TPMS 20.

The indirect-type TPMS 20 may measure wheel speeds of tires, estimate that the rolling radius of a tire is decreased, and if there is a difference between the wheel speeds, determining that the pneumatic pressure of the tire is decreased through such an estimation.

The indirect-type TPMS 20 may measure wheel speeds of respective tires, collect the measured data and measure pneumatic tire pressures through a logic or algorithm, such as an ABS device or a DDS device.

Figure 3:
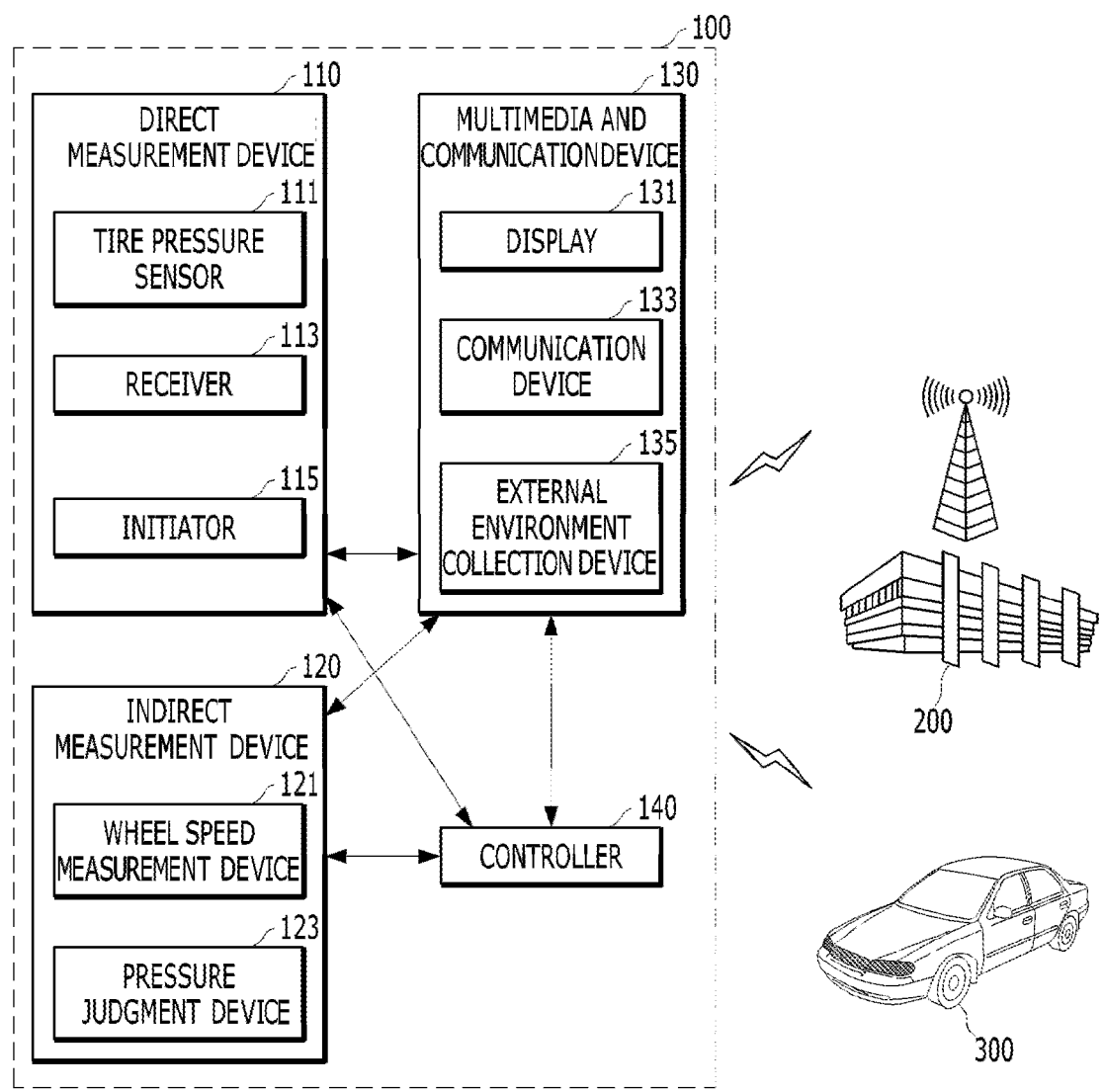
FIG. 3 is a block diagram illustrating a configuration of a Tire Pressure Monitoring System (TPMS) disposed in a vehicle in accordance with exemplary embodiments of the present disclosure.

FIG. 3 is a block diagram illustrating a configuration of a Tire Pressure Monitoring System (TPMS) 100 disposed in a vehicle in accordance with exemplary embodiments of the present disclosure.

The Tire Pressure Monitoring System (TPMS) 100 may include a direct measurement device 110, an indirect measurement device 120, a multimedia and communication device 130 and a controller 140.

The direct measurement device 110 is a module which directly measures pneumatic pressures of tires through tire pressure sensors 111, a receiver 113 and an initiator 115.

The tire pressure sensor 111 may be installed at each tire and mounted at a tire valve. The tire pressure sensor 111 may also be installed at a spare tire. The tire pressure sensor 111 may measure the temperature, pressure etc. of a tire and a remaining state of charge of a battery.

The tire pressure sensors 111 may communicate with the receiver 113 through RF communication, but the disclosure is not limited thereto.

The receiver 113 may control the logic of the TPMS 100 in the vehicle, control the initiator 115, and communicate with the tire pressure sensors 111 and various Electronic Control Devices (ECUs) in the vehicle through RF communication, but the disclosure is not limited thereto. Further, in exemplary embodiments, when the receiver 113 communicates with the tire pressure sensors 111, an RF frequency is used and, thus, preparation for a loss of a frequency signal due to conductive and radioactive noise is made.

The receiver 113 may communicate with the multimedia and communication device 130.

Although RF communication may be executed between the receiver 113 and the tire pressure sensors 111, high-speed CAN communication may be executed between other elements of the vehicle. However, the disclosure is not limited thereto.

The initiator 115 may serve as a repeater interconnecting the receiver 113 and the tire pressure sensors 111. Here, a low frequency (LF) may be used, but the disclosure is not limited thereto. The initiator 115 may wake the tire pressure sensors 111.

The initiator 115 may be awoken through an external smart key, a smartphone, etc., but the disclosure is not limited thereto.

The indirect measurement device 120 does not directly measure pressures of the tires but may indirectly measure pressures of the tires according to driving of the vehicle.

Wheel speed measurement devices 121 are devices to measure wheel speeds of the respective tires.

A pressure judgment device 123 may collect wheel speed information measured by the respective wheel speed measurement devices 121 and, if the wheel speed of a specific tire does not reach a reference value, may determine that the pressure of the specific tire is low.

The pressure judgment device 123 may receive data from an ESP controller and a steering angle sensor. If the vehicle is being steered or an Electronic Stability Program (ESP) system is being operated, reliability of TMS data may be insufficient. If the vehicle skids or the ESP system controls stability of the vehicle, the left and right sides of the vehicle or speeds of the respective wheels of the vehicle are reversed, accurate TPMS data may not be collected. In this case, the controller 140 does not use data collected in an indirect mode but may operate the TPMS 100 in a direct mode, but the disclosure is not limited thereto.

The multimedia and communication device 130 may include a display 131, a communication device 133 and an external environment collection device 135.

The display 131 may include an AVN display and a rear seat display, etc. The display 131 may communicate with the receiver 113 through conventional vehicle communication (for example, CAN communication).

If an abnormality of the pneumatic pressure of a tire occurs, the display 17 may display a notification and provide notice of a tire pressure problem to passengers through a specific sound. The display 131 may turn on a warning lamp and provide various noises to the passengers.

The communication device 133 includes a telematics module installed therein and may thus communicate with various centers 200 (for example, a telematics center). The communication device 133 may include various modules which may be connected to various centers, servers, etc. through various communication methods.

The communication device 133 may receive various pieces of data from the external center 200. The communication device 133 may receive a report regarding problems, which may obstruct direct measurement of tire pressures from the external center 200.

For example, the communication device 133 may receive information on a strong electric field area where a substation or a transmission tower is disposed and thus electromagnetic interference is severe, a high-rise building concentrated area, a place where various frequencies are radiated, a place where a frequency is radiated from an unmanned robot, a place where an electric distribution panel is disposed, a place where an unknown frequency is radiated, transmission of a frequency in a military device or other places with similar properties.

Further, the communication device 133 may receive a report on problems obstructing indirect measurement of tire pressures from the external center 200.

For example, the communication device 133 may receive unpaved road information, area information influencing wheel speeds of tires, etc. from the external center 200.

The communication device 133 may receive various pieces of information from an external vehicle 300. The communication device 133 may receive strong electric field area information, road information, etc. from the external vehicle 300.

The communication device 133 may provide information collected from the vehicle 300 to the external center 200 in real time.

The external environment collection device 135 may store various pieces of information received through the communication device 133.

The controller 140 is a device which generally controls the above-described direct measurement device 110, indirect measurement device 120 and multimedia and communication device 130.

The controller 140 may directly or indirectly measure pneumatic tire pressures, receive external information negatively, or adversely, influencing a measurement of the pneumatic tire pressures, and may be operated so as to correspond to such external information.

The external center 200 may provide information on various environmental factors that may obstruct a measurement of pneumatic tire pressures to, or by, the TPMS 100. The external center 200 may be an external telematics center, a big data center or a vehicle electric field management center, but the disclosure is not limited thereto.

If an abnormality of pneumatic pressures of the tires occurs, the TPMS 100 may provide various notifications so that vehicle passengers may be aware of an occurrence of an abnormality. For example, the TPMS 100 may inform the passengers of an occurrence of an abnormality through sound, vibration, a turning-on of a warning lamp, etc.

Figure 4:
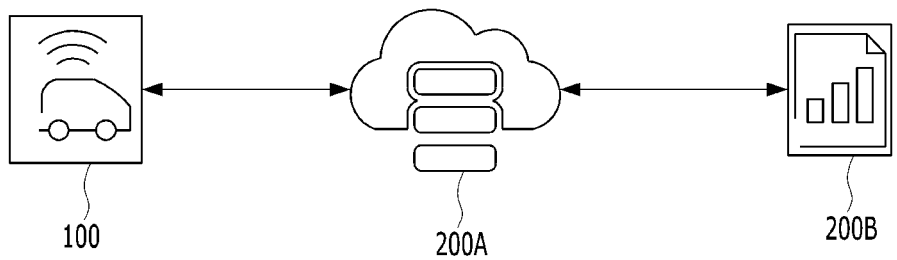
FIG. 4 is a view illustrating a big data server connected to a TPMS installed in a connected car in accordance with exemplary embodiments of the present disclosure.

FIG. 4 is a view illustrating a big data server 200A connected to a TPMS 100 installed in a connected car in accordance with exemplary embodiments of the present disclosure.

The TPMS 100 may provide information related to the TPMS 100 in real time. For example, the TPMS 100 may provide directly measured pneumatic tire pressure information in real time.

The big data server 200A may analyze information based on the received pneumatic tire pressure information and external environmental information.

In more detail, the big data server 200A may judge whether or not it is proper that the TPMS 100 directly measures pneumatic tire pressures or whether it is proper that the TPMS 100 indirectly measures pneumatic tire pressures, in connection with the a big database (DB) 200B.

The big data server 200A may be a telematics center or a vehicle electric field management center, but the disclosure is not limited thereto.

The big data server 200A may provide environmental information, road information, etc. to the TPMS 100 in real time and collect vehicle state information (whether or not the vehicle skids, the low state of the pneumatic tire pressures, whether or not sensors are properly functioning, etc.) from the TPMS 100 through the communication device 133 (for example, a telematics module) in real time.

Figure 5:
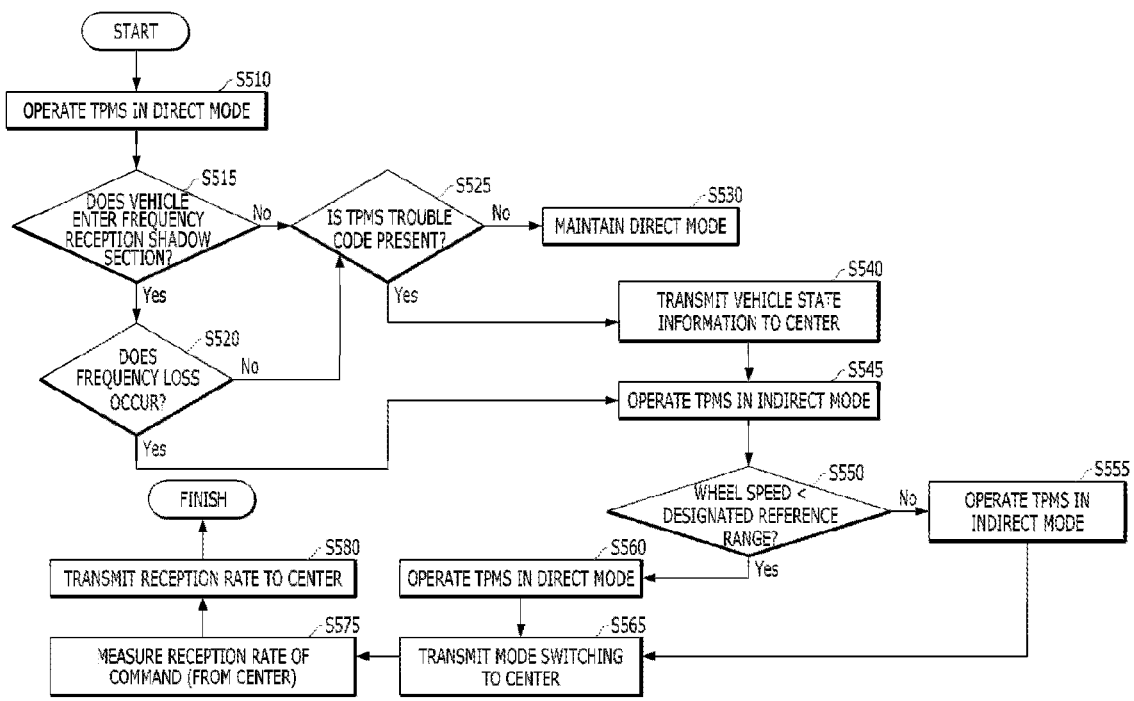
FIG. 5 is a flowchart illustrating a method of operating the TPMS shown in FIG. 3.

FIG. 5 is a flowchart illustrating a method of operating the TPMS 100 shown in FIG. 3. Hereinafter, the method will be described with reference to the reference numerals shown in FIG. 3.

First, the TPMS 100 is operated in the direct mode (Operation S510).

However, the disclosure is not limited thereto and the TPMS 100 may be operated in the indirect mode.

When the ignition of the vehicle is turned on, the TPMS 100 is initialized and measures tire pressures. Further, after determining whether or not the current operating state of the vehicle corresponds to a normal driving mode state is judged by the ESP controller, the wheel speed sensors, etc., the tire pressures may be measured.

If the vehicle enters a frequency reception shadow section (Operation S515), an error of a transmitting frequency in the direct mode of the TPMS 100 may occur.

For example, the TPMS 100 may receive information on a strong electric field area where a substation or a transmission tower is disposed and thus electromagnetic interference is severe, a high-rise building concentrated area, a place where various frequencies are radiated, a place where a frequency is radiated from an unmanned robot, a place where an electric distribution panel is disposed, a place where an unknown frequency is radiated, transmission of a frequency in a military device or other places with similar properties from the center 200.

The center 200 may transmit road information to the TPMS 100 in real time. If the TPMS 100 is operated in the indirect mode, the TPMS 100 may switch to the direct mode according to road information.

Further, the TPMS 100 may be greatly influenced by external environmental noise, such as electronic devices and jamming at the inside/outside of the vehicle, the direction and position of the receiver 113, and weather conditions.

If the TPMS 100 receives information on a section, where propagation loss may occur, from the center 200, the TPMS 100 may switch from the direct mode to the indirect mode. However, the TPMS 100 may judge whether or not frequency loss occurs.

Thereafter, the TPMS 100 judges whether or not frequency loss occurs (Operation S520).

The controller 140 may judge whether or not frequency loss between the tire pressure sensors 111 and the receiver 113 occurs and then transmit a judgment result to the center 200.

As such, when tire pressures are monitored, the controller 140 may apply a tire pressure monitoring method suitable for the vehicle in consideration of environments to the TPMS 100.

If the vehicle does not enter the frequency reception shadow section (Operation S515), whether or not the TPMS 100 has failed is determined (Operation S525).

Whether or not the TPMS 100 has failed may be confirmed using a Diagnostic Trouble Code (DTC), but the disclosure is not limited thereto.

If the TPMS 100 has not failed, the TPMS 100 maintains the direct mode (Operation S530).

If frequency loss occurs (Operation S520), the TPMS 100 transmits vehicle state information to the center 200 (Operation S540).

The TPMS 100 may transmit various pieces of vehicle information to the center 200 in real time. The center 200 may provide a command effective to set the TPMS 100 to the controller 140 through the communication device 133 based on information received from the vehicle.

Thereafter, the TPMS 100 is operated in the indirect mode (Operation S545).

However, the TPMS 100 may consider various conditions. When the TPMS 100 is operated in the indirect mode, if the vehicle skids or an event such as ESP control occurs, the TPMS 100 may maintain the direct mode.

If wheel speeds are within a designated reference range (Yes in Operation S550), the TPMS 100 switches back to the direct mode (Operation S560).

That is, if the wheel speeds are within the designated reference range in the indirect mode, the TPMS 100 may judge that the pneumatic tire pressures are normal and switch to the direct mode, but the disclosure is not limited thereto.

If any wheel speed deviates from the designated reference range (No in Operation S550), the TPMS 100 is operated in the indirect mode (Operation S555) and transmits mode switching to the center 200 (Operation S565).

Further, the TPMS 100 measures a reception rate of the command received from the center 200 (Operation S575) and transmits the reception rate to the center 200 (Operation S580).

Further, the center 200 may provide information on sections where the TPMS 100 needs to be operated in the direct mode and sections where the TPMS 100 needs to be operated in the indirect mode, acquired by analyzing big data, to the vehicle. The center 200 may provide detailed matters of specific sections to the TPMS 100.

In accordance with the above-described exemplary embodiments, tire pressures may be accurately monitored and thus a risk of breakage of tires may be reduced.

As described above, if the TPMS 100 in the direct mode enters the reception shadow section due to sensor error or external noise and may thus not receive pneumatic tire pressure information through the receiver 113 and not display the pneumatic pressure information, the TPMS 100 may switch to the indirect mode and may thus maintain tire pneumatic information for a designated time by comparing speed information of the respective wheels with wheel speed information prior to an occurrence of a failure (for example, a reception performance error or a sensor error).

In this case, the TPMS 100 may provide a notification through a cluster or an AVN display, or provide a notification to a user by turning on a warning lamp by triggering an error code. Thereby, customer safety and convenience may be promoted.

As is apparent from the above description, the present disclosure has effects below.

First, the present disclosure may provide a tire pressure monitoring system which monitors tire pressures using big data, thus being capable of improving system stability and accuracy.

Second, the present disclosure may provide a tire pressure monitoring system which measures tire pressures in a combined direct and indirect method, thus being capable of improving accuracy in measurement and user convenience and stability.

The above-described method in accordance with exemplary embodiments may be implemented as a program executable in a computer and stored in a computer readable recording medium. Computer readable recording media include a ROM, a RAM, CD-ROM, a magnetic tape, a floppy disk, an optical data storage system, etc. Further, the computer readable recording media may be realized as a carrier wave (for example, transmission over the Internet).

The computer readable recording media may be stored and implemented as code which is distributed in computer systems connected by a network and readable by computers in a distributed manner. Further, functional programs, code and code segments to realize the above-described method may be easily deduced by programmers skilled in the art.

It will be apparent to those skilled in the art that various modifications and variations can be made in the present disclosure without departing from the spirit or scope of the disclosure. Thus, it is intended that the present disclosure cover the modifications and variations of this disclosure provided they fall within the scope of the appended claims and their equivalents.

What is claimed is:

1. A method of operating a Tire Pressure Monitoring System (TPMS) configured to communicate with a center, comprising:
   executing tire pressure monitoring of at least one tire installed on a vehicle in a first mode; and
   transmitting frequency signal loss information to the center if a loss of a frequency signal in the first mode occurs in a designated time period,
   wherein, when information on a frequency shadow area is received from the center, the tire pressure monitoring is switched to a second mode from the first mode until the vehicle deviates from the frequency shadow area.

2. The method according to claim 1, further comprising switching execution of tire pressure monitoring to the first mode if a wheel speed of the at least one tire is within a designated range.

3. The method according to claim 2, further comprising:
   transmitting a determination result as to whether or not mode switching is executed to the center; and
   measuring a reception rate of a command received from the center and transmitting the measured reception rate to the center.

4. The method according to claim 1, wherein:
   the first mode is a mode for directly measuring a pneumatic pressure of the at least one tire; and
   the second mode is a mode for indirectly measuring a pneumatic pressure of the at least one tire based on a wheel speed of the at least one tire.

5. The method according to claim 1, wherein the step of switching execution of tire pressure monitoring to the second mode is carried out if the vehicle enters a frequency shadow section and a diagnostic trouble code (DTC) is recognized.

6. The method according to claim 1, further comprising receiving environmental information or road information from the center in real time, and setting a mode to execute tire pressure monitoring based on the received environmental information or road information.

7. A Tire Pressure Monitoring System (TPMS) configured to communicate with a center comprising:
   a first measurement device for executing tire pressure monitoring of at least one tire installed on a vehicle in a first mode; and
   a controller for transmitting frequency signal loss information to the center if a loss of a frequency signal in the first mode occurs in a designated time period,
   wherein, when information on a frequency shadow area is received from the center, the controller switches execution of tire pressure monitoring to a second mode from the first mode until the vehicle deviates from the frequency shadow area.

8. The TPMS according to claim 7, further comprising a second measurement device for executing tire pressure monitoring of the at least one tire in the second mode.

9. The TPMS according to claim 8, wherein the controller:
   controls the second measurement device so as to measure a wheel speed of the at least one tire; and
   switches execution of tire pressure monitoring to the first mode if the wheel speed of the at least one tire is within a designated range.

10. The TPMS according to claim 9, wherein the controller transmits a determination result as to whether or not mode switching is executed to the center, measures a reception rate of a command received from the center, and transmits the measured reception rate to the center.

11. The TPMS according to claim 7, wherein:
    the first mode is a mode for directly measuring a pneumatic pressure of the at least one tire; and
    the second mode is a mode for indirectly measuring a pneumatic pressure of the at least one tire based on a wheel speed of the at least one tire.

12. The TPMS according to claim 7, wherein the controller switches execution of tire pressure monitoring to the second mode if the vehicle enters a frequency shadow section and a diagnostic trouble code (DTC) is recognized.

13. The TPMS according to claim 7, wherein, if environmental information or road information is received from the center in real time, the controller sets a mode to execute tire pressure monitoring based on the received environmental information or road information.

14. A computer readable recording medium of recording a program to implement the method according to claim 1, executed by a processor.

\* \* \* \* \*